(12) United States Patent
Shi et al.

(10) Patent No.: US 12,056,780 B2
(45) Date of Patent: Aug. 6, 2024

(54) GEOLOGICAL PROPERTY MODELING WITH NEURAL NETWORK REPRESENTATIONS

(71) Applicant: Landmark Graphics Corporation, Houston, TX (US)

(72) Inventors: Genbao Shi, Sugar Land, TX (US); Mehran Hassanpour, Houston, TX (US); Steven Bryan Ward, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 240 days.

(21) Appl. No.: 17/130,708

(22) Filed: Dec. 22, 2020

(65) Prior Publication Data

US 2022/0198587 A1    Jun. 23, 2022

(51) Int. Cl.
G06Q 50/00    (2024.01)
G06N 3/08     (2023.01)
G06Q 50/16    (2012.01)

(52) U.S. Cl.
CPC ............. *G06Q 50/16* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 5,361,201 A * | 11/1994 | Jost ........................ | G06Q 40/02 705/35 |
| 5,745,392 A | 4/1998 | Ergas et al. | |
| 6,021,378 A | 2/2000 | Reiter et al. | |
| 6,405,136 B1 | 6/2002 | Li et al. | |
| 8,811,156 B1 | 8/2014 | Qin et al. | |
| 10,558,543 B2 | 2/2020 | Harutyunyan et al. | |
| 10,984,489 B1 * | 4/2021 | Bruce ..................... | G06N 20/00 |
| 11,164,199 B2 * | 11/2021 | Lundgren .......... | G06Q 30/0206 |
| 2009/0119018 A1 | 5/2009 | Priezzhev et al. | |
| 2010/0161498 A1 * | 6/2010 | Walker ............... | G06Q 30/0278 705/306 |
| 2011/0264575 A1 * | 10/2011 | Kanitra .................. | G06Q 30/02 705/35 |
| 2015/0356576 A1 * | 12/2015 | Malaviya ........... | G06Q 30/0202 705/7.31 |
| 2019/0064389 A1 | 2/2019 | Denli et al. | |
| 2020/0034661 A1 | 1/2020 | Kim et al. | |
| 2020/0074270 A1 | 3/2020 | Zadrozny et al. | |

(Continued)

OTHER PUBLICATIONS

Sarang Bhargava, Why there is a need to delete duplicate files, Oct. 23, 2020, www.TweakLibrary.com (Year: 2020).*

(Continued)

*Primary Examiner* — Naresh Vig
(74) *Attorney, Agent, or Firm* — DeLizio, Peacock, Lewin & Guerra, LLP

(57) ABSTRACT

A neural network trainer trains neural networks to estimate secondary data at locations throughout a geological formation where secondary data is unknown. The neural networks are trained to estimate secondary data using locations in the geological formation as input. Subsequently, the secondary data is deleted from memory using the trained neural network as a proxy representation to reduce memory footprint and allow for estimation of secondary data at locations where it is unknown.

20 Claims, 8 Drawing Sheets

(56) References Cited

U.S. PATENT DOCUMENTS

2020/0160173 A1     5/2020  Pandey et al.
2021/0319304 A1*   10/2021  Tawil .................... G01V 1/48
2022/0084079 A1*    3/2022  Stewart .............. G06Q 30/0206

OTHER PUBLICATIONS

Stewart Michael, Accurately valuing homes with deep learning and structural inductive biases, Sep. 8, 2020, www.medium.com (Year: 2020).*
Baldominos et al., Identifying real estate opportunities using machine learning, Nov. 21, 2018m www.mdpi.com (Year: 2018).*
Co-Simulation Overview, Sep. 22, 2020, docs.helics.org, printed through www.archive.org (Year: 2020).*
James L. Smith, Petroleum Property Valuation, Jun. 2, 2003, Southern Methodist University (Year: 2003).*
Bergadano et al., "Learning Real Estate Automated Valuation Models from Heterogeneous Data Sources", Sep. 4, 2019, www.arxiv.org (Year: 2019).*
PCT Application No. PCT/US2020/066899, International Search Report, mailed Sep. 14, 2021, 4 pages.
PCT Application No. PCT/US2020/066899, Written Opinion, mailed Sep. 14, 2021, 5 pages.

* cited by examiner

GEOLOGICAL PROPERTY MODELING WITH NEURAL NETWORK REPRESENTATIONS

TECHNICAL FIELD

The disclosure generally relates to the field of subsurface formation evaluation and to storage and estimation of petrophysical properties in a subsurface formation.

BACKGROUND

Secondary data is geological data used in modeling primary data throughout a geological formation. The secondary data is present at a larger set of locations in the geological formation than the primary data and therefore can be used to supplement the primary data. Missing primary data of locations can be filled in using petrophysical property modeling that combines the primary data at known locations with secondary data at unknown locations. Common property modeling techniques include cokriging and collocated cosimulation.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to estimating secondary data using a representative trained neural network stored on a cloud geological database in illustrative examples. Embodiments of this disclosure can be instead applied to estimating secondary data using a representative trained neural network stored in a centralized geological database or any other type of geological database. In other instances, well-known instruction instances, protocols, structures and techniques have not been shown in detail in order not to obfuscate the description.

Overview

Secondary data comprising property values of a geological formation can be expensive to store in memory due to the large number of properties present in the data and the requirement that properties be stored for locations throughout a geological formation of interest. Herein, instead of storing the secondary data directly in memory, a trained neural network is stored that can reproduce the secondary data at each location. A user interface provides the geological formation of interest and a neural network architecture to a neural network trainer. The neural network trainer initializes a neural network with the prescribed architecture and trains the neural network to estimate property values in the secondary data using locations within the geological formation as input. The neural network trainer compares outputs of the neural network comprising estimated property values with the secondary data stored in memory and updates the internal parameters of the neural network based on the comparison until the estimates and secondary data converge. Subsequent to model training, the geological database deletes the secondary data and instead stores the trained neural network as a representation. The user interface provides locations at which to retrieve secondary data when it is used for primary data modeling. The storage of a trained neural network instead of the secondary data allows for estimation of the secondary data at previously known and unknown locations and smoothing of the secondary data at a significantly reduced memory load.

Example Illustrations

Figure 1:
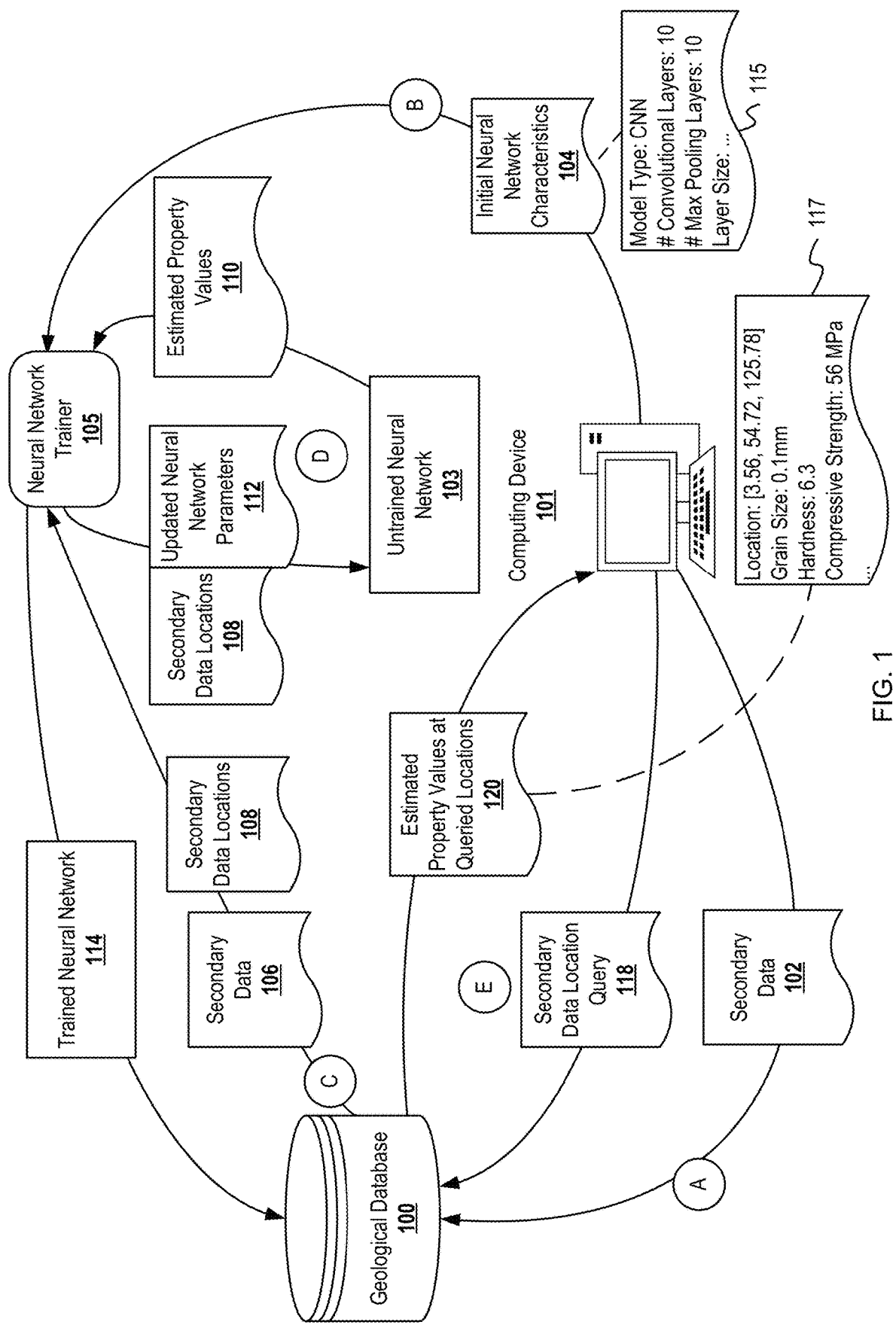
FIG. 1 is a schematic diagram of an example system for estimating secondary data with a neural network.

FIG. 1 is a schematic diagram of an example system for estimating secondary data with a neural network. FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a computing device 101 communicates a secondary data 102 to a geological database 100. The secondary data 102 comprises locations in one or more geological formations at which to estimate secondary data and obtain secondary data for at least a subset of those locations. The set of locations can comprise 3-dimensional coordinates in the one or more geological formations, wherein the coordinates are framed with respect to a set reference location (e.g., a central location at the surface). The secondary data 102 can additionally comprise types of geological parameters such as crust thickness, sediment thickness, grain size, hardness, compressive strength, lithosphere type, heat flow, etc. to be estimated as secondary data at the provided locations. The choice of geological parameters can comprise geological parameters that are known to be commonly measured in the geological formation(s) where the secondary data will be estimated. The computing device 101 can communicate the secondary data 102 to the geological database 100 in response to receiving incoming secondary data from an oil or gas operation.

At stage B, the computing device 101 communicates initial neural network characteristics 104 to a neural network trainer 105. The initial neural network characteristics 104 comprise parameters for the internal architecture of a neural network to be used for secondary data estimation. These parameters can comprise the example neural network characteristics 115 including a model type of a convolutional neural network (CNN), a number of convolutional layers of 10, a number of max pooling layers of 10, a layer size for each of the convolutional and max pooling layers, etc. The internal architecture of the neural network can depend on the desired rigidity of the resulting secondary data. For instance, having a neural network with fewer internal parameters (i.e. fewer layers and smaller layers) will result in a smoothing of the secondary data, whereas having a neural network with more internal parameters results in more rigid secondary data estimates. Other considerations include whether the secondary data is being estimated at a significant (e.g., above a threshold proportion) of locations without previous data, the desired generalization versus training error, the amount of available secondary data, etc. The neural network architecture is such that the input comprises a location vector (e.g., three numerical entries corresponding to location coordinates) and the output vector comprises a geological parameter vector for all of the geological parameters in the secondary data 102.

At stage C, the geological database 100 communicates secondary data 106 and secondary data locations 108 corresponding to the secondary data 102 to a neural network trainer 105. The geological database 100 can be indexed by location and/or geological parameters and distributed across a cloud network of machines. The secondary data 106 and the secondary data locations 108 can be retrieved across servers, virtual machines, storage devices, etc. in the geological database 100 and the geological database 100 can be optimized to efficiently retrieve secondary data 106 and secondary data locations 108 in parallel. The geological database 100 can delete the secondary data 106 and/or the secondary data locations 108 from cloud storage thereafter because a trained neural network will be used to represent the secondary data 106 at each of the secondary data locations 108 in later stages. This reduces user cost of having to store all secondary data across geological formations in cloud storage.

At stage D, the neural network trainer 105 initializes an untrained neural network 103 with the initial neural network characteristics 104. The neural network trainer 105 can initialize different types of layers with different weights depending on the type of layer, layer size, etc. For instance, fully connected layers can be initialized with standard normal Gaussian entries (possibly normalized so that the vector of weights has a fixed norm), whereas max pooling or averaging layers can have fixed weights at initialization and throughout training. Once initialized, the neural network trainer 105 inputs the secondary data locations 108 into the untrained neural network 103. The neural network trainer 105 then evaluates estimated property values 110 output from the untrained neural network 103 and, based on the difference between the estimated property values 110 and property values present at identical locations in the secondary data 106, determines updated neural network parameters 112 (e.g., by backpropagation) comprising weights of internal nodes. These operations iterate until one or more training criteria is satisfied. Examples of training criteria include a reaching a maximal number of iterations, training until the estimated property values 110 converge to the property values in the secondary data 106, and training until another training criterion or combination of criteria is satisfied (e.g., the generalization error is sufficiently low). The neural network trainer 105 then communicates a trained neural network 114 to the geological database 100 for storage. Upon receiving the trained neural network 114, the geological database 100 can remove entries corresponding to the secondary data 106 from memory, thus reducing user storage costs.

At stage E, a user interacting with the computing device 101 inputs a secondary data locations query 118 for locations at which secondary data is to be estimated by a trained neural network. The geological database 100 receives the secondary data location query 118 and retrieves a trained neural network corresponding to the locations in the secondary data location query 118. Trained neural networks can be indexed by locations for which secondary data was used to trained them, locations that they are indicated for estimating secondary data, by network architecture (e.g., network type, number of internal layers/neurons), etc. The secondary data location query 118 can indicate, in addition to a set of locations at which secondary data is to be estimated, a type of neural network and/or a desired rigidity of the neural network (i.e., the complexity or number of internal parameters of the neural network). The geological database 100 inputs locations in the secondary data location query 118 into the retrieved trained neural network 114 and sends the resulting estimated property values at queried locations 120 output by the trained neural network 114 to the computing device 101. Example estimated property values 117 include a location with coordinates [3.56, 52.72, 125.78], a grain size of 0.1 mm, a hardness of 6.3, and a compressive strength of 56 megapascal (MPa). In embodiments where a trained neural network satisfying the secondary data location query 118 is not found in the geological database 100, the operations at stages B-D can be iterated to train an additional neural network to estimate secondary data for the secondary data location query 118.

Figure 2:
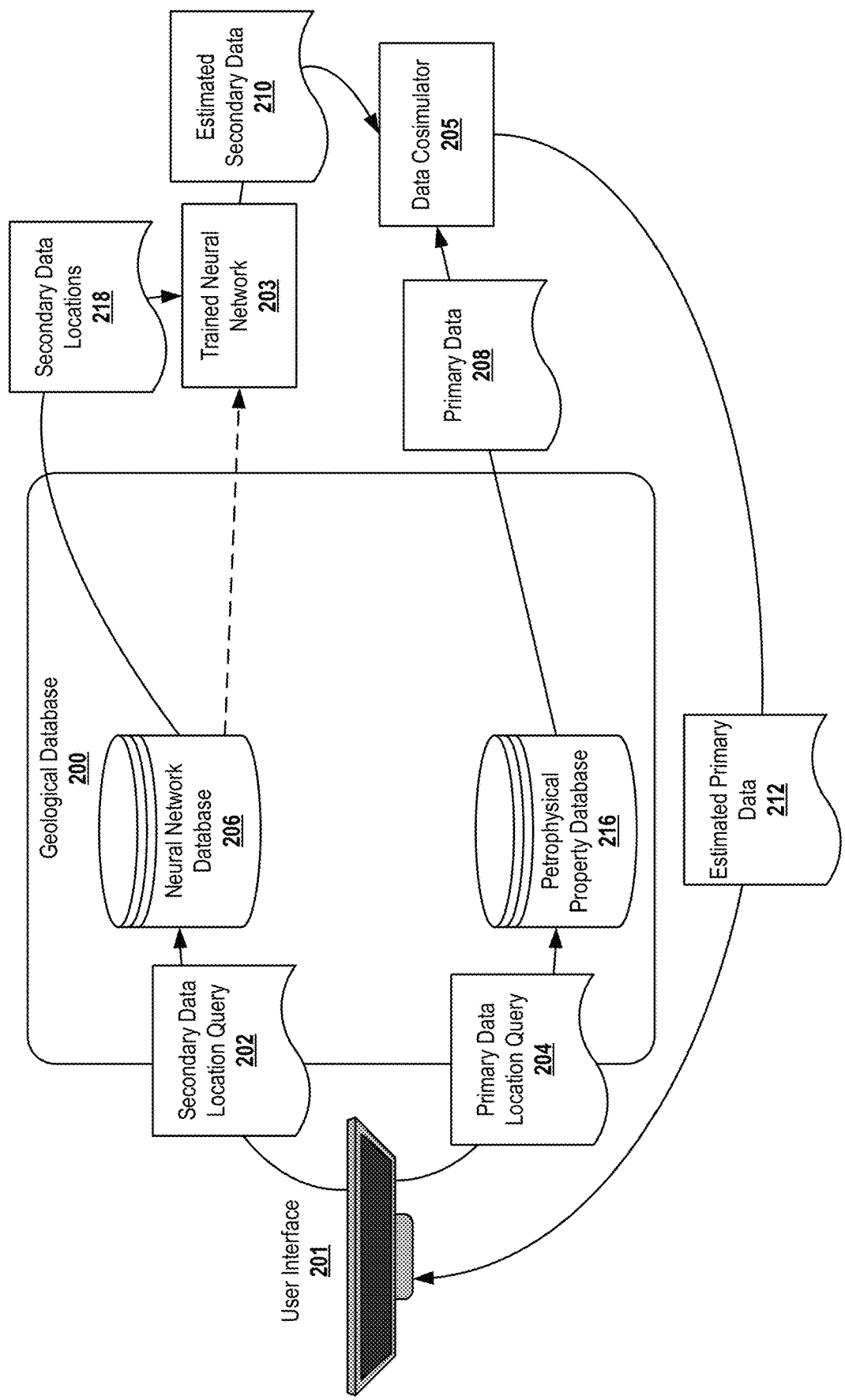
FIG. 2 is a schematic diagram of a system for estimating primary data based on estimating secondary data with a trained neural network.

FIG. 2 is a schematic diagram of a system for estimating primary data based on estimating secondary data with a trained neural network. A user interface 201 communicates a secondary data location query 202 and a primary data location query 204 to a neural network database 206 and a petrophysical property database 216, respectively. The neural network database 206 and the petrophysical property database 216 are embedded or hosted on a geological database 200. The neural network database 206 retrieves a trained neural network 203 corresponding to the secondary data location query 202 and inputs secondary data locations 218 into the trained neural network 203 to generate estimated secondary data 210 as output. The petrophysical property database 216 retrieves primary data 208 corresponding to the primary data location query 204. A data cosimulator 205 receives the estimated secondary data 210 and primary data 208 and uses a cosimulation technique to generate estimated primary data 212 which it communicates back to the user interface.

The user interface 201 can be any customer-facing interface that allows a user to specify queries related to data in a formation. For instance, the user interface can be integrated into a logging or control unit at a logging or drilling operation. The logging or control unit can have an external connection to the geological database 200 which can be a decentralized cloud storage service offsite. The secondary data location query 202 comprises coordinates for one or more locations at which secondary data will be estimated. The primary data location query 204 comprises coordinates for one or more locations at which primary data 208 will be retrieved. In some instances, the set of locations in the primary data location query 204 may be a subset of the secondary data location query 202 because primary data may not be available at all the locations at which secondary data will be estimated. In this case, the geological database 200 takes the secondary data location query 202 as input and retrieves primary data 208 at or near the locations indicated in the secondary data location query 202 from the petrophysical property database 216. The primary data location query 204 can further indicate locations at which primary data will be estimated using cosimulation. The secondary data location query 202 can further indicate a desired network type, architecture, size, etc. These parameters can be chosen based on the desired smoothness of the resulting estimated secondary data 210.

The geological database 200 can process the secondary data location query 202 for indications of one or more locations and/or network characters and subsequently search the neural network database 206 for the trained neural network 203 based on the indications. The neural network database 206 can be indexed by location and/or parameters of the neural networks (e.g., type, number of internal nodes, architecture, etc.). In some embodiments, the trained neural network 203 can be multiple trained neural networks that cover the entire set of locations indicated in the secondary data location query 202. In other embodiments, there may be no trained neural network corresponding to the set of locations and network characteristics. The geological database 200 can expand the query—for instance, by removing the network characteristics from the query—or can train a new neural network (e.g., as depicted in FIG. 1) to satisfy the secondary data location query 202. Once retrieved, the geological database 200 inputs the secondary data locations 218 with a possible preprocessing step into the trained neural network 203 to generate the estimated secondary data 210.

The neural network database 206 and petrophysical property database 216 can be integrated into a larger cloud geological database that, in some embodiments, is provided as Software-as-a-Service to in order to store primary and secondary data collected at one or more oil/gas operations. Thus, primary and secondary data can be stored across cloud resources. A separate module possibly running on the geological database 200 can perform operations to retrieve data corresponding to the secondary data location query 202 and the primary data location query 204. In some embodiments, the separate module can maintain an index of locations of existing secondary and primary data (as well as parameters of any corresponding trained neural networks) and can formulate queries directly to a cloud service storing the data in the neural network database 206 and the petrophysical property database 216. The schematic components illustrated in FIG. 2 provide one possible embodiment of how the geological database 200 is configured and the geological database 200 can in other embodiments be a separate cloud service that performs simple lookup operations and the operations performed by each component can vary.

The data cosimulator 205 can run any cosimulation algorithm on the estimated secondary data 210 and the primary data 208. The cosimulation algorithm can be any algorithm that models a dependent variable (e.g., the primary data) using an auxiliary variable (e.g., the secondary data). For instance, kriging with external drift or any other type of regression kriging can be used. The resulting estimated primary data 212 comprises estimates of primary data at a larger set of locations than in the primary data 208, and the estimated primary data 212 reconciles the estimated secondary data 210 with the estimated primary data 212 at locations not present in the primary data 208. A user receiving the estimated primary data 212 via the user interface 201 can then guide an oil or gas operation based on property values contained therein.

Figure 3:
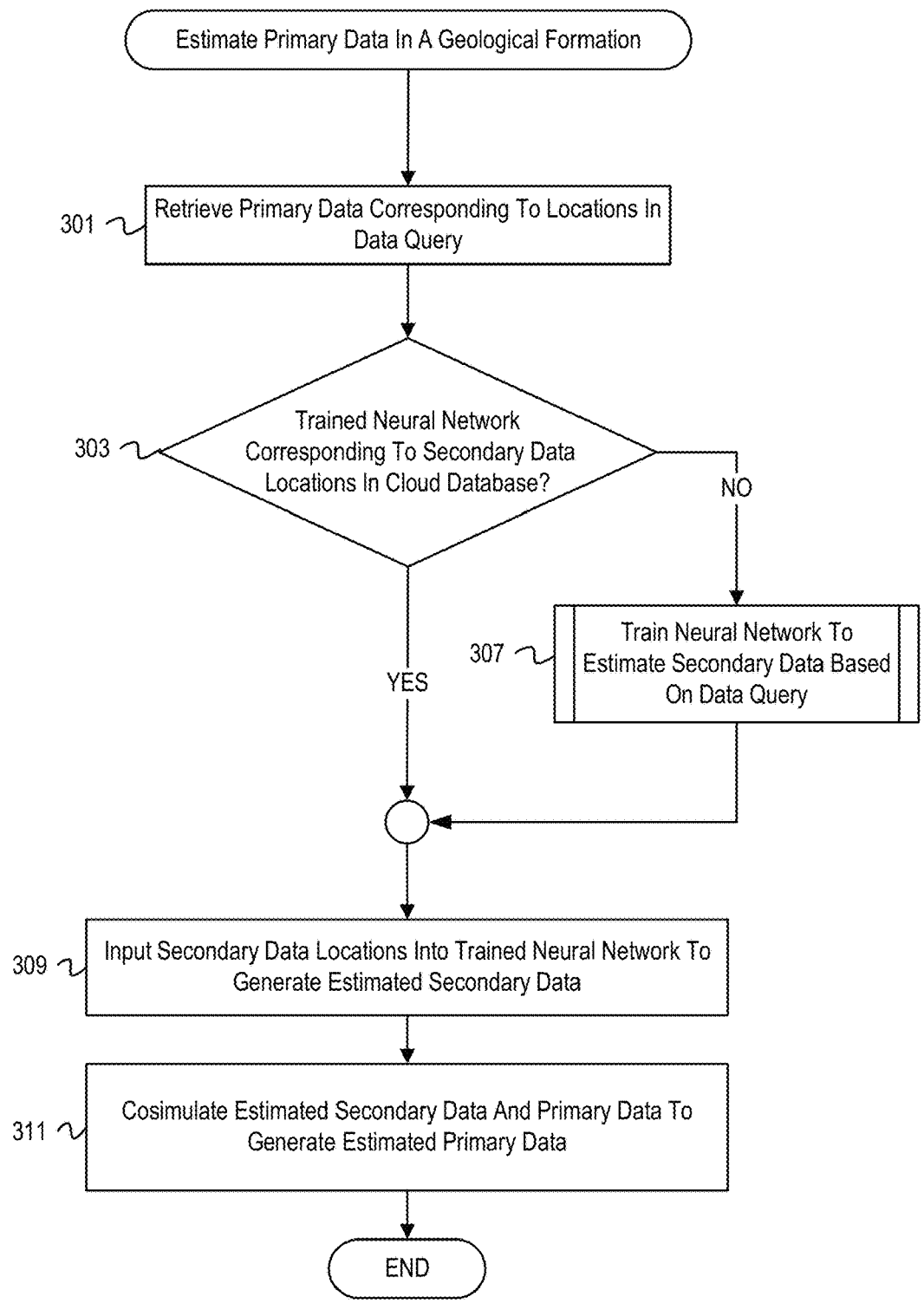
FIG. 3 is a flowchart of example operations for estimating primary data in a geological formation using a trained neural network.
Figure 4:
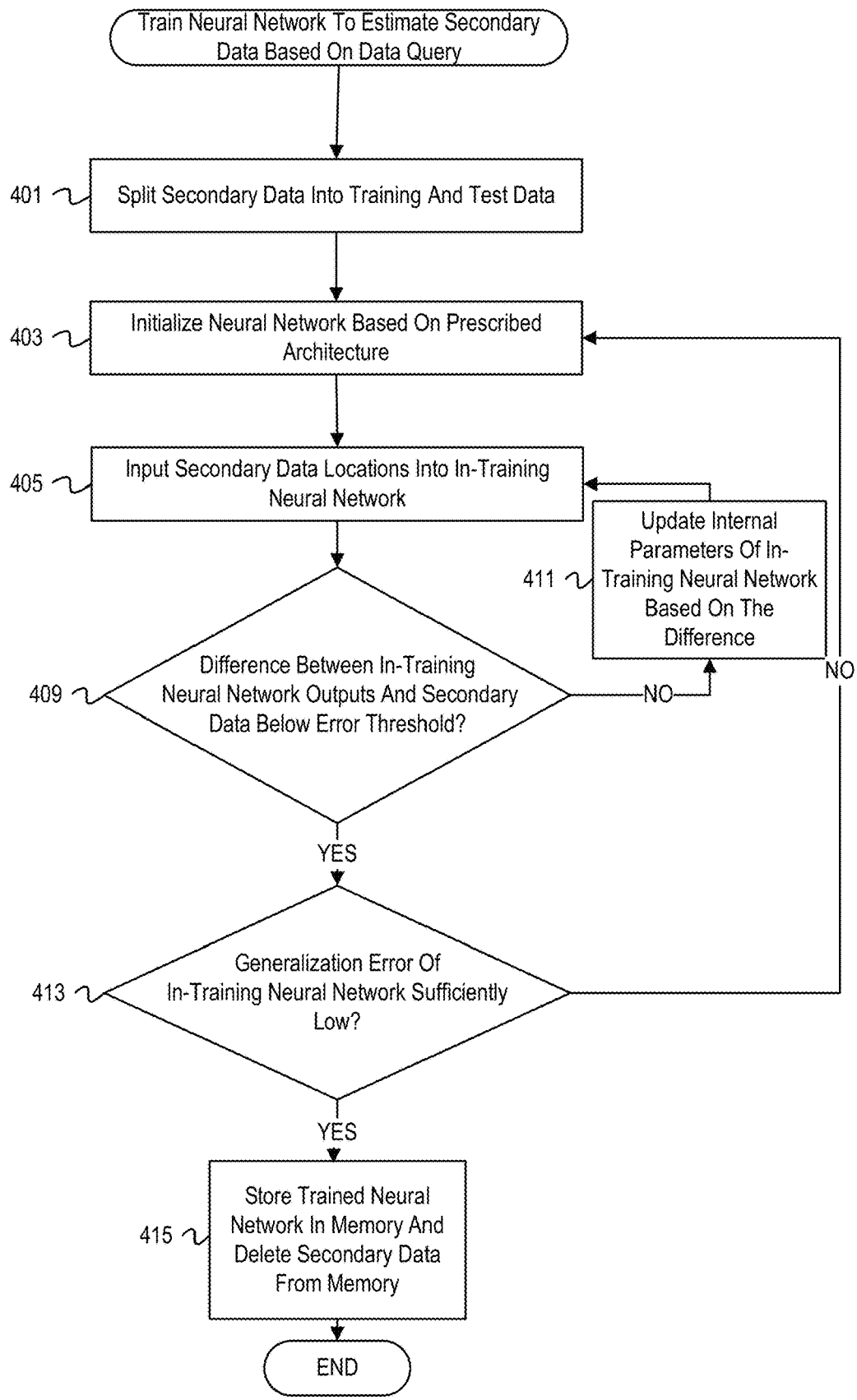
FIG. 4 is a flowchart of example operations for training a neural network to estimate secondary data based on a data query.
Figure 6:
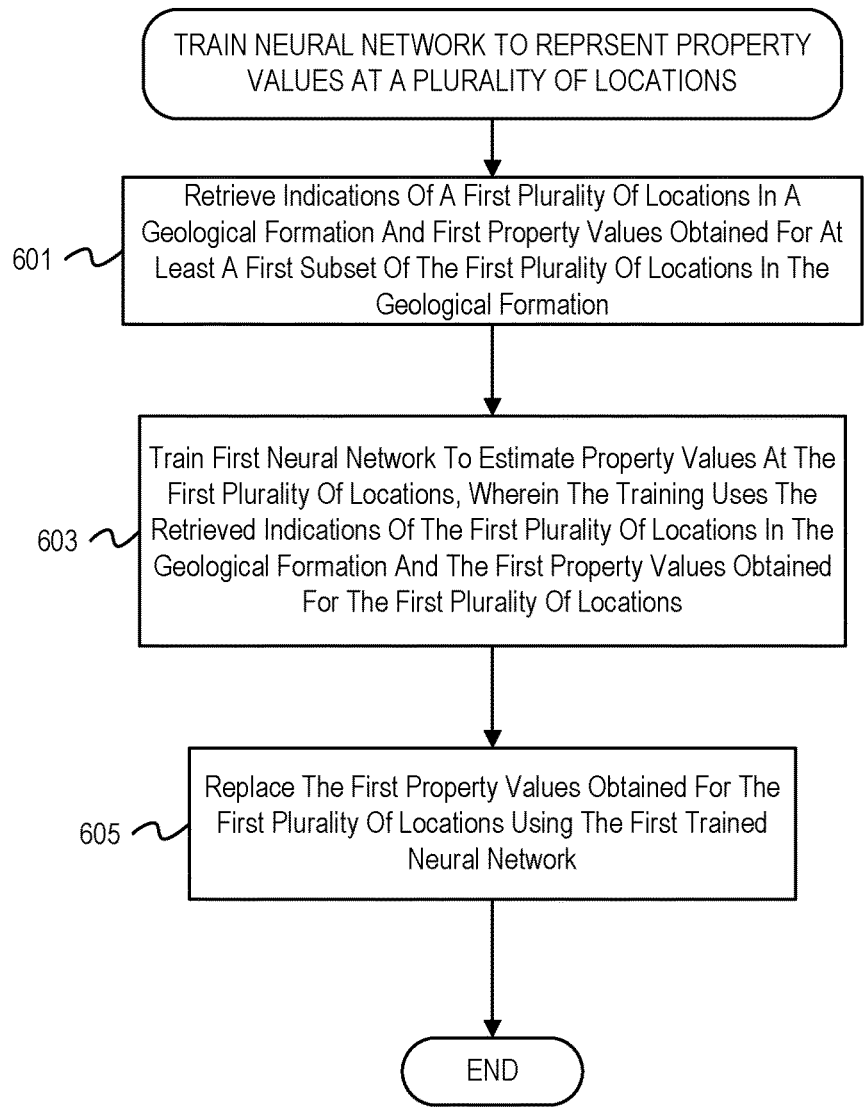
FIG. 6 is a flowchart of example operations for training a neural network to represent property values at a plurality of locations.

The example operations in FIGS. 3, 4, and 6 are described with reference to a geological database, a data cosimulator, and a neural network trainer for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for estimating primary data in a geological formation using a trained neural network. At block 301, a geological database retrieves primary and secondary data corresponding to locations indicated in a data query. The data query can comprise locations at which to estimate secondary data, locations at which to estimate primary data, locations at which to retrieve data, parameters of a neural network to be used to estimate secondary data, etc. The geological database can retrieve primary data corresponding to locations for primary data indicated in the data query. In some embodiments, the data query does not comprise locations at which to retrieve primary data, and the geological database can retrieve available primary data at secondary data locations indicated in the data query and/or in a neighborhood of secondary data locations indicated in the data query. "Primary" and "secondary" data are used herein to denote that "primary" data is data that will be used to guide operations at a logging or drilling operation and "secondary" data is auxiliary data collected during the logging or drilling operation that can be used to estimate or reinforce primary data (e.g., using cosimulation algorithms). Nonetheless, secondary data can comprise property values for attributes that will also be used to guide logging or drilling operations, and the label "secondary" data, in this instance, refers to its' use in estimation or reinforcement of primary data for other attributes. Primary data typically corresponding to petrophysical property values measured directly by sensor downhole, while secondary data can additionally refer to indirect property values such as seismic property values.

At block 303, the geological database determines whether there is a trained neural network stored corresponding to secondary data locations and/or neural network criteria indicated in the data query. The geological database can be indexed by locations and/or neural network characteristics. The geological database can, in some embodiments, broaden the search criterion contained in the data query when no trained neural networks are found, for instance by removing a requirement for a particular type of neural network to be retrieved. If a trained neural network corresponding to the data query is present in the geological database, operations skip to block 309. Otherwise, operations continue to block 307.

At block 307, a neural network trainer trains a neural network to estimate secondary data based on the data query. The operations at block 307 are described in greater detail in FIG. 4.

At block 309, the geological database inputs secondary data locations from the data query into the trained neural network to generate estimated secondary data. The trained neural network is trained to estimate secondary data at known and unknown locations. The quality and smoothness of the resulting estimated secondary data can depend on the parameters of the trained neural network (e.g., network type, network architecture, number of internal parameters, etc.). For instance, a trained neural network with fewer internal parameters and/or network layers can have the effect of smoothing out estimated secondary data and, in some embodiments, can additionally be applied to known secondary data to smooth it out as well.

At block 311, a data cosimulator cosimulates the estimated secondary data and primary data to generate estimated primary data. The cosimulator can use any algorithm to model a dependent variable based on an auxiliary variable including typical algorithms for geological cosimulation such as kriging with external drift or universal kriging. The resulting estimated primary data is consistent with known primary data and is modeled using the estimated secondary data at locations where the primary data is unknown.

FIG. 4 is a flowchart of example operations for training a neural network to estimate secondary data based on a data query. At block 401, a neural network trainer splits secondary data into training and test data. The training and test data can be chosen randomly and can depend on a desired training and generalization error for the neural network which can be specified by the data query. For instances where cross-validation is implemented, the secondary data can instead be split into k (e.g., k=10) data sets chosen uniformly at random.

At block 403, the neural network trainer initializes a neural network based on a network architecture prescribed by the data query. The data query can comprise parameters of the neural network such as number of layers, size/type of each layer, input size, output size, etc. to be initialized. When necessary network characteristics are omitted from the data query, the neural network trainer can make standard choices instead. The initialized neural network can further comprise a preprocessor that converts location data into a format to be input in the neural network (e.g., by normalization).

At block 405, the neural network trainer inputs the secondary data in the in-training neural network. The input comprises locations of secondary data present in the secondary data. The in-training neural network can comprise a preprocessor that normalizes the locations before input. For instance, the in-training neural network can normalize vectors for the locations to have mean zero and variance one. Other normalizations across multiple location vectors can be implemented.

At block 409, the neural network trainer determines whether the outputs of the in-training neural network and the secondary data have a difference below an error threshold. The outputs of the in-training neural network are vectors of secondary property values corresponding to the input location vector and the neural network trainer compares them with secondary property values contained in the training secondary data. If the difference (e.g., in Euclidean norm of output vectors) is below the error threshold or if a threshold number of iterations has been reached, operations proceed to 413. Otherwise operations continue to block 411.

At block 411, the neural network trainer updates internal parameters of the in-training neural network based on the difference between outputs and the secondary data. For instance, the neural network trainer can backpropagate an error function for the outputs of the in-training neural network and the secondary data through the internal layers of the network. The updates comprise replacement values at nodes for internal layers of the network to use in the next iteration of training.

At block 413, the neural network trainer determines whether the generalization error of the in-training neural network is sufficiently low. The neural network trainer inputs locations in the testing secondary data into the in-training neural network and compares secondary property values output by the in-training neural network with secondary property values in the testing data. If the generalization error (determined, e.g., by adding errors across all the testing data) is sufficiently low, operations continue to block 415. Otherwise, operations return to block 403.

At block 415, the neural network trainer stores the trained neural network in memory and deletes the secondary data used in the training and testing data from memory. For subsequent secondary data queries to memory, the trained neural network is used instead with the queried locations as input. The memory can be cloud memory provided as a service and the trained neural network can thus be stored as a memory footprint across resources. The secondary data can be stored in cloud memory prior to deletion, reducing resources and costs associated with data storage.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 301 and 307 can be performed in parallel or concurrently. With respect to FIG. 3, a data cosimulator is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
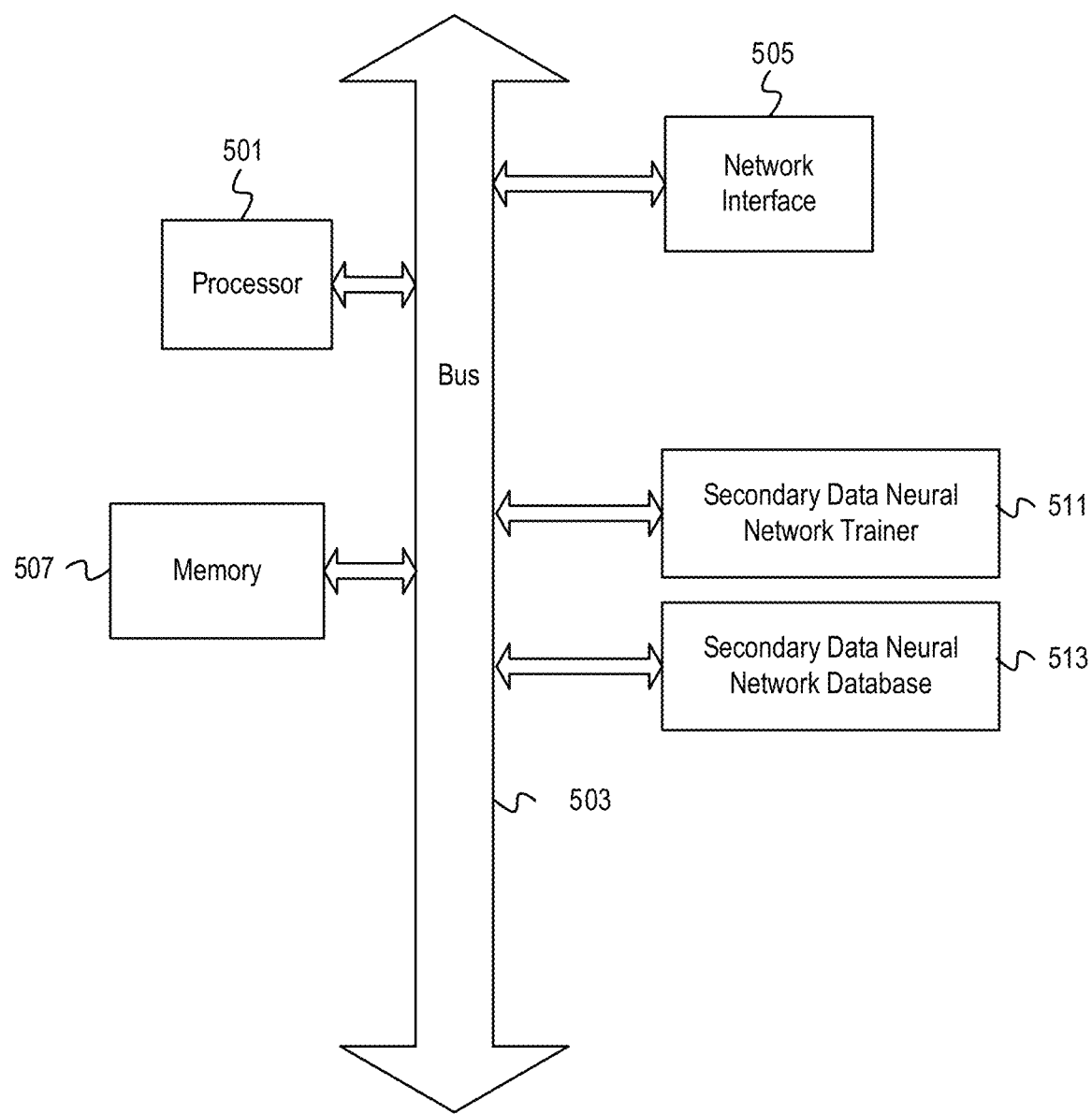
FIG. 5 depicts an example computer system with a secondary data neural network trainer and a secondary data neural network database.

FIG. 5 depicts an example computer system with a secondary data neural network trainer and a secondary data neural network database. The computer system includes a processor 501 (possibly including multiple processors, multiple cores, multiple nodes, and/or implementing multithreading, etc.). The computer system includes memory 507. The memory 507 may be system memory or any one or more of the above already described possible realizations of machine-readable media. The computer system also includes a bus 503 and a network interface 505. The system communicates via transmissions to and/or from remote devices via the network interface 505 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a secondary data neural network trainer 511 and a secondary data neural network database 513. The secondary data neural network trainer 511 can train neural networks to estimate secondary property values using locations in a geological formation as input. The secondary data neural network database 513 can subsequently store trained neural networks and delete secondary data used to train and test the neural networks. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

FIG. 6 is a flowchart that discloses the present technology in broader/distinct terminology as an attempt to account for the shortcoming of language to describe novel technology. For instance, the term "neural network" is used to generically refer to a model for estimation of property values regardless of internal architecture or model type. These flowcharts do not refer to a specific actor since there are numerous implementations for organizing and developing program code, as well as various choices for deployment on different hardware and/or virtualization.

FIG. 6 is a flowchart of example operations for training a neural network to represent property values at a plurality of locations. At block 601, a geological database retrieves indications of a first plurality of locations in a geological formation and first property values obtained for at least a first subset of the first plurality of locations in the geological formation. The indications can comprise coordinates for locations in the geological formation with reference to some coordinate frame. The first property values can comprise values for a geological property downhole.

At block 603, a neural network trainer trains a first neural network to estimate property values at the first plurality of locations, wherein the training uses the retrieved indications of the first plurality of locations in the geological formation and the first property values obtained for the first plurality of locations. The neural network trainer can input locations corresponding to the indications of the first plurality of locations in the geological formation into the first neural network and, based on the difference between neural network outputs and the first property values, can update internal parameters of the neural network in a series of training operations until training criteria are satisfied.

At block 605, the geological database replaces the first property values obtained for the first plurality of locations with the first trained neural network. The geological database can, subsequently, input property values into the trained neural network in response to future queries for one or more of the first property values and use the neural network outputs in the query response.

Figure 7:
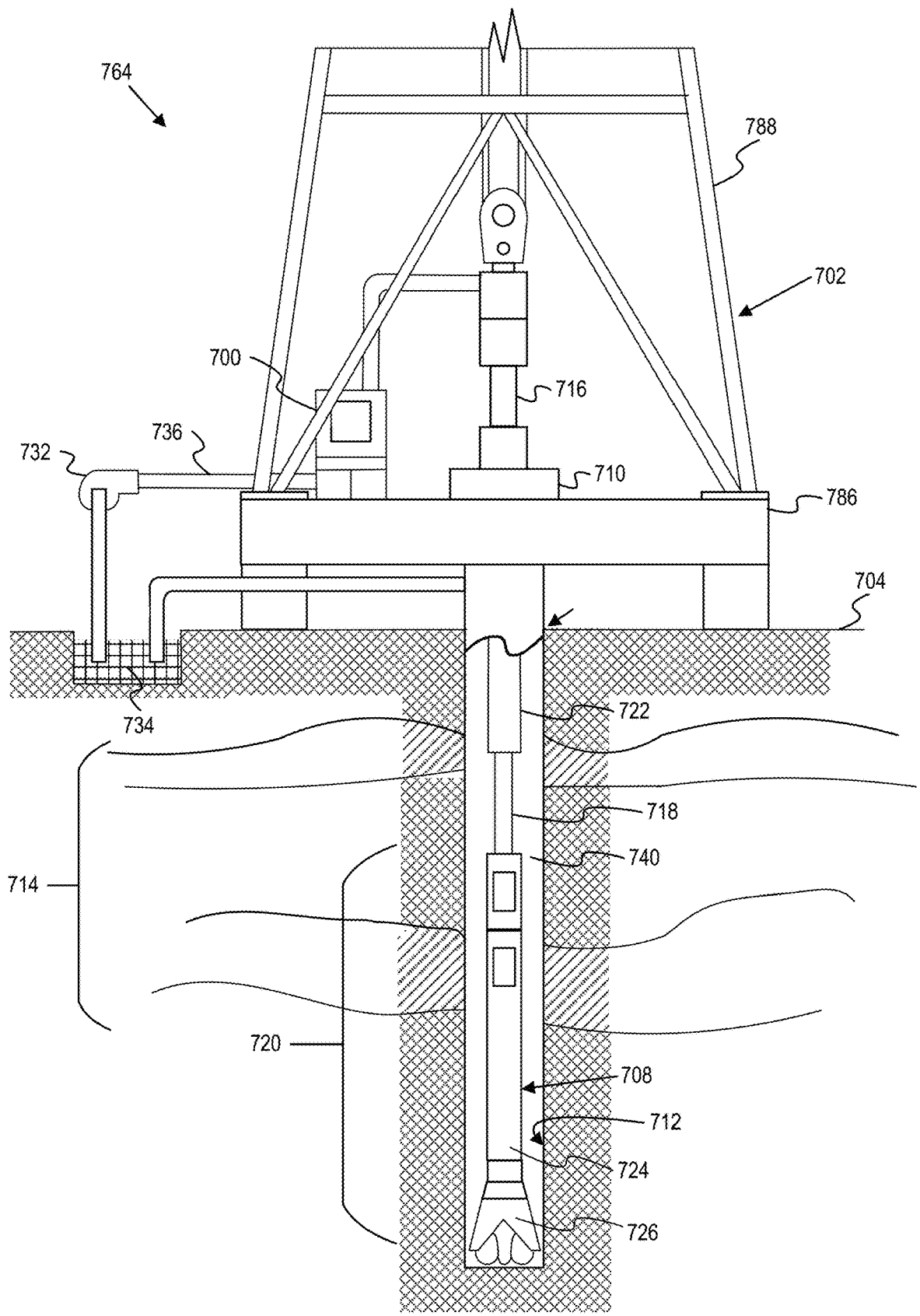
FIG. 7 is a schematic diagram of a drilling rig system with a secondary data neural network trainer and a secondary data neural network database.

FIG. 7 is a schematic diagram of a drilling rig system with a secondary data neural network trainer and a secondary data neural network database. For example, in FIG. 7 it can be seen how a system 764 may also form a portion of a drilling rig 702 located at the surface 704 of a well 706. Drilling of oil and gas wells is commonly carried out using a string of drill pipes connected together so as to form a drilling string 708 that is lowered through a rotary table 710 into a wellbore or borehole 712. A drilling platform 786 is equipped with a derrick 788 that supports a hoist. The drilling rig 702 can thus provide support for the drill string 708. The drill string 708 can operate to penetrate the rotary table 710 for drilling the borehole 712 through subsurface formations 714. The drill string 708 can include a Kelly 716, drill pipe 718, and a bottom hole assembly 720, perhaps located at the lower portion of the drill pipe 718. The bottom hole assembly 720 can include drill collars 722, a down hole tool 724, and a drill bit 726. The drill bit 726 can operate to create a borehole 712 by penetrating the surface 704 and subsurface formations 714. The down hole tool 724 can comprise any of a number of different types of tools including MWD tools, LWD tools, and others.

During drilling operations, the drill string 708 (perhaps including the Kelly 716, the drill pipe 718, and the bottom hole assembly 720) can be rotated by the rotary table 710. In addition to, or alternatively, the bottom hole assembly 720 can also be rotated by a motor (e.g., a mud motor) that is located down hole. The drill collars 722 can be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations, a mud pump 732 can pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 712. The drilling fluid can then be returned to the mud pit 734, where such fluid is filtered. A computing device 700 can monitor the drilling fluid as it flows through the hose 736. The computing device 700 can be in communication with an operator and the operator can logs tasks performed by the system 764. A secondary data neural network trainer running on the computing device 700 can train predictive models to predict secondary data and subsequently store the secondary data neural networks in a secondary neural network database in place of the secondary data in memory. In some embodiments, the drilling fluid can be used to cool the drill bit 726, as well as to provide lubrication for the drill bit 726 during drilling operations. Additionally, the drilling fluid can be used to remove subsurface formation 714 cuttings created by operating the drill bit 726. It is the images of these cuttings that many embodiments operate to acquire and process.

Figure 8:
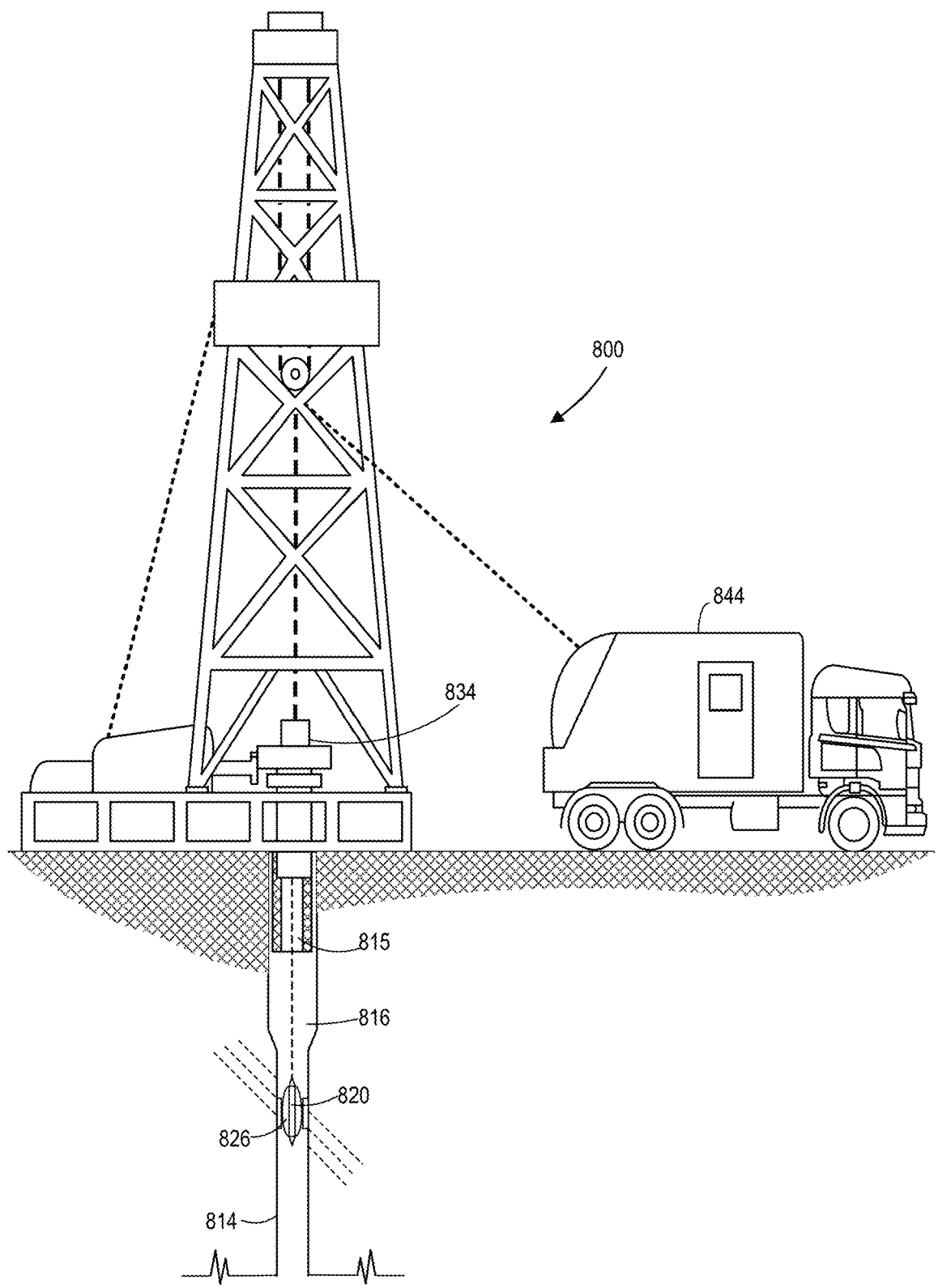
FIG. 8 depicts a schematic diagram of a wireline system with a secondary data neural network trainer and a secondary data neural network database.

FIG. 8 depicts a schematic diagram of a wireline system with a secondary data neural network trainer and a secondary data neural network database. A system 800 can be used in an illustrative logging environment with a drillstring removed, in accordance with some embodiments of the present disclosure. Subterranean operations can be conducted using a wireline system 820 once the drillstring has been removed, though, at times, some or all of the drillstring can remain in a borehole 814 during logging with the wireline system 820. The wireline system 820 can include one or more logging tools 826 that can be suspended in the borehole 814 by a conveyance 815 (e.g., a cable, slickline, or coiled tubing). The logging tool 826 can be communicatively coupled to the conveyance 815. The conveyance 815 can contain conductors for transporting power to the wireline system 820 and telemetry from the logging tool 826 to a logging facility 844. Alternatively, the conveyance 815 can lack a conductor, as is often the case using slickline or coiled tubing, and the wireline system 820 can contain a control unit 834 that contains memory, one or more batteries, and/or one or more processors for performing operations and storing measurements. The logging facility 844 can store data for tasks manually input by an operator of the system 800. A secondary data neural network trainer running on the logging facility 844 can train secondary data neural networks to estimate secondary data using locations as input and can store the secondary data neural networks in a secondary data neural network database, as described variously herein.

In certain embodiments, the control unit 834 can be positioned at the surface, in the borehole (e.g., in the conveyance 815 and/or as part of the logging tool 826) or both (e.g., a portion of the processing can occur downhole and a portion can occur at the surface). The control unit 834 can include a control system or a control algorithm. In certain embodiments, a control system, an algorithm, or a set of machine-readable instructions can cause the control unit 834 to generate and provide an input signal to one or more elements of the logging tool 826, such as the sensors along the logging tool 826. The input signal can cause the sensors to be active or to output signals indicative of sensed properties. The logging facility 844 (shown in FIG. 8 as a truck, although it can be any other structure) can collect measurements from the logging tool 826, and can include computing facilities for controlling, processing, or storing the measurements gathered by the logging tool 826. The computing facilities can be communicatively coupled to the logging tool 826 by way of the conveyance 815 and can operate similarly to the control unit 834. In certain example embodiments, the control unit 834, which CAN BE LOCATED IN LOGGING TOOL 826, CAN PERFORM ONE OR MORE FUNCTIONS OF THE COMPUTING FACILITY.

The logging tool 826 includes a mandrel and a number of extendible arms coupled to the mandrel. One or more pads are coupled to each of the extendible arms. Each of the pads have a surface facing radially outward from the mandrel. Additionally, at least sensor disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

While the aspects of the disclosure are described with reference to various implementations and exploitations, it will be understood that these aspects are illustrative and that the scope of the claims is not limited to them. In general, techniques for training and storing neural networks to estimate secondary data using locations in a geological formation as input, then subsequently deleting the training and testing secondary data from memory as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

TERMINOLOGY

The term "geological database" is used alternatively to describe a geological database containing primary and secondary data and a separate module that handles geological database queries and performs lookups based on the geological database queries. In some instances, the module can perform advanced lookup operations and, based on lookup failure, can perform additional operations such as sending instructions to a neural network trainer to train a neural network based on secondary data at certain locations and with network characteristics. Embodiments of a geological database as including a separate module should not be construed as limiting and a geological database can refer to any of the embodiments provided herein, or combinations thereof.

The term "geological formation" as used herein can refer to one or more contiguous bodies of rock having consistent lithology or can refer to one or more disjointed bodies of rock, each also having consistent lithology. In some instances, a geological formation can comprise both contiguous and disjointed bodies of rock. A geological formation can refer to one or more sub-bodies of a larger body of rock having consistent lithology, and any aggregation thereof with sub-bodies and bodies of rock having consistent lithology. Any of the aforementioned embodiments of geological formations can be combined into a single "geological formation."

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource (hereinafter "cloud service") accessible to customers is a resource owned/manage by the cloud service provider entity that is accessible via network connections. Often, the access is in accordance with an application programming interface or software development kit provided by the cloud service. provider Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   retrieving, via a computerized geological database and one or more processors, original primary data and original secondary data obtained for at least a first subset of a first plurality of locations in a first geological formation;
   training, via the one or more processors, a first neural network to generate estimated secondary data at the first plurality of locations and at a plurality of unknown locations in the first geological formation;
   replacing the original secondary data with the first trained neural network;
   generating estimated primary data using the original primary data and the first trained neural network; and
   guiding an oil and gas operation, based, at least in part, on the estimated primary data.

2. The method of claim 1, further comprising:
   replacing first geological property values of the original secondary data with the first trained neural network;
   storing the first trained neural network in memory;
   associating, in memory, the first trained neural network with the first plurality of locations in the first geological formation;
   deleting the first geological property values from memory; and
   responding, via the one or more processors, to a query to the computerized geological database for the first geological property values obtained for the first plurality of locations with output from the first trained neural network.

3. The method of claim 2, wherein the memory comprises memory in cloud storage.

4. The method of claim 2, further comprising,
   retrieving the first trained neural network based, at least in part, on the query, the query indicating one or more of the first plurality of locations in the first geological formation; and
   generating first estimated geological property values at a second subset of the first plurality of locations in the first geological formation based, at least in part, on inputting indications of the second subset of the first plurality of locations into the first trained neural network.

5. The method of claim 4, wherein the indications of the second subset of the first plurality of locations comprises coordinates for the second subset of the first plurality of locations.

6. The method of claim 4, wherein the query further indicates one or more network characteristics of the first trained neural network.

7. The method of claim 2, further comprising:
   retrieving, via the computerized geological database, indications of the first plurality of locations in the first geological formation and first geological property values,
   wherein the training uses the retrieved indications of the first plurality of locations in the first geological formation and the first geological property values obtained for the first plurality of locations, and
   wherein replacing the first geological property values obtained for the first plurality of locations with the first trained neural network comprises associating the first trained neural network with the indications of the first plurality of locations in the first geological formation.

8. The method of claim 1, further comprising training a second neural network to estimate geological property values at a second plurality of locations in a second geological formation using second geological property values obtained for at least a subset of the second plurality of locations in the second geological formation.

9. The method of claim 8, wherein training the second neural network to estimate the geological property values at the second plurality of locations in the second geological formation is based, at least in part, on a query indicating one or more of the second plurality of locations in the second geological formation.

10. One or more non-transitory machine-readable media comprising program code to:
    retrieve, via a computerized geological database and one or more processors, original primary data and original secondary data obtained for at least a first subset of a first plurality of locations in a first geological formation;
    train, via the one or more processors, a first neural network to generate estimated secondary data at the first plurality of locations and at a plurality of unknown locations in the first geological formation;
    replace the original secondary data with the first trained neural network;
    generate estimated primary data using the original primary data and the first trained neural network; and
    guide an oil and gas operation based, at least in part, on the estimated primary data.

11. The non-transitory machine-readable media of claim 10, further comprising program code to:
    replace first geological property values of the original secondary data with the first trained neural network;
    store the first trained neural network in memory;
    associate, in memory, the first trained neural network with the first plurality of locations in the first geological formation;
    delete the first geological property values from memory; and respond, via the one or more processors, to a query to the computerized geological database for the first geological property values obtained for the first plurality of locations with output from the first trained neural network.

12. The non-transitory machine-readable media of claim 11, wherein the memory comprises memory in cloud storage.

13. The non-transitory machine-readable media of claim 1, further comprising program code to:
retrieve the first trained neural network based, at least in part, on the query, the query indicating one or more of the first plurality of locations in the first geological formation; and
generate first estimated geological property values at a second subset of the first plurality of locations in the first geological formation based, at least in part, on inputting indications of the second subset of the first plurality of locations into the first trained neural network, wherein the indications of the second subset of the first plurality of locations comprises coordinates for the second subset of the first plurality of locations.

14. The non-transitory machine-readable media of claim 13, wherein the query further indicates one or more network characteristics of the first trained neural network.

15. The non-transitory machine-readable media of claim 10, further comprising program code to train a second neural network to estimate geological property values at a second plurality of locations in a second geological formation using second geological property values obtained for at least a subset of the second plurality of locations in the second geological formation.

16. The non-transitory machine-readable media of claim 15, wherein the program code to train the second neural network to estimate the geological property values at the second plurality of locations in the second geological formation is based, at least in part, on a query indicating one or more of the second plurality of locations in the second geological formation.

17. The non-transitory machine-readable media of claim 10, further comprising program code to:
retrieve, via the computerized geological database, indications of the first plurality of locations in the first geological formation and first geological property values,
wherein the program code configured to train the first neural network comprises program code to use the retrieved indications of the first plurality of locations in the first geological formation and the first geological property values obtained for the first plurality of locations, and
wherein the program code to replace the first geological property values obtained for the first plurality of locations with the first trained neural network comprises program code to associate the first trained neural network with the indications of the first plurality of locations in the first geological formation.

18. An apparatus comprising:
one or more processors; and
a machine-readable medium having program code executable by the processor to cause the apparatus to, retrieve, via a computerized geological database and the one or more processors, original primary data and original secondary data obtained for at least a first subset of a first plurality of locations in a first geological formation;
train, via the one or more processors, a first neural network to generate estimated secondary data at the first plurality of locations and at a plurality of unknown locations in the first geological formation;
replace the original secondary data with the first trained neural network;
generate estimated primary data using the original primary data and the first trained neural network; and
guide an oil and gas operation based, at least in part, on the estimated primary data.

19. The apparatus of claim 18, further comprising program code executable by the one or more processors to cause the apparatus to:
process, via the computerized geological database, a query indicating at least the first plurality of locations in the first geological formation at which to estimate geological property values;
retrieve, based on the query, the first trained neural network that was trained to estimate geological property values at a second plurality of locations in the first geological formation, wherein the second plurality of locations at least include one or more of the first plurality of locations; and
generate, via the computerized geological database, first estimated geological property values at the first plurality of locations in the first geological formation based, at least in part, on inputting indications of the first plurality of locations into the first trained neural network,
wherein the query further indicates one or more network characteristics of the first trained neural network.

20. The apparatus of claim 19, further comprising program code executable by the one or more processors to cause the apparatus to train a second neural network to estimate geological property values at the first plurality of locations in the first geological formation based, at least in part, on an absence of a trained neural network satisfying the query.

* * * * *